(12) United States Patent
Cotie et al.

(10) Patent No.: US 7,559,649 B2
(45) Date of Patent: Jul. 14, 2009

(54) CORNEAL-SCLERAL ORTHOKERATOLOGY CONTACT LENS

(75) Inventors: Robert L. Cotie, Irving, TX (US); Cary M. Herzberg, Yorkville, IL (US)

(73) Assignee: Dakota Sciences, LLC, Sioux Falls, SD (US)

(*) Notice: Subject to any disclaimer, the term of this patent is extended or adjusted under 35 U.S.C. 154(b) by 208 days.

(21) Appl. No.: 11/292,763

(22) Filed: Dec. 2, 2005

(65) Prior Publication Data

US 2006/0152673 A1 Jul. 13, 2006

Related U.S. Application Data

(60) Provisional application No. 60/634,494, filed on Jan. 12, 2005.

(51) Int. Cl.
G02C 7/04 (2006.01)
(52) U.S. Cl. .................. 351/160 H; 351/160 R
(58) Field of Classification Search ............ 351/160 H, 351/160 R, 162
See application file for complete search history.

(56) References Cited

U.S. PATENT DOCUMENTS

| | | | |
|---|---|---|---|
| 2,164,801 A | 7/1939 | Dittmer | |
| 2,618,200 A | 11/1952 | Clave et al. | |
| 2,641,161 A | 6/1953 | Silverstein | |
| 3,195,145 A | 7/1965 | Tisher et al. | |
| 3,246,941 A | 4/1966 | Moss | |
| 3,495,899 A | 2/1970 | Biri | |
| 3,760,807 A * | 9/1973 | Neefe | 424/429 |
| 4,194,815 A | 3/1980 | Trombley | |
| 4,239,353 A * | 12/1980 | Koller | 351/160 H |
| 4,547,049 A | 10/1985 | Cotie et al. | |
| 4,601,556 A | 7/1986 | Siviglia | |
| 4,895,439 A | 1/1990 | Stoller | |
| 4,952,045 A * | 8/1990 | Stoyan | 351/160 R |
| 4,997,268 A | 3/1991 | Dauvergne | |

(Continued)

FOREIGN PATENT DOCUMENTS

FR 1299573 6/1962

(Continued)

OTHER PUBLICATIONS

The Contact Lens—Past, Present, and Future; Viscom Publications, Inc.; 1987 (13 pages).

*Primary Examiner*—Joseph Martinez
*Assistant Examiner*—James R Greece
(74) *Attorney, Agent, or Firm*—Douglas W. Ruoy

(57) ABSTRACT

A corneal-scleral orthokeratology contact lens is formed of rigid gas permeable material with uniform arc lengths in the treatment area even when the corneal curvature varies and asymmetric blends or splines called minor zones, where the portion of the blend or spline is shorter toward the lens center and broader toward the lens edge, and relieve the treatment area of all centering responsibility, transferring it to the limbal-scleral region. The method of determining the total sagittal height of an eye at a given chord diameter to predetermine exact fitting parameters and predict unaided visual outcome trial lenses, with exact chord and sagittal height values used to match the sagittal height of an eye, the sagittal value may be obtained from some ocular topographers. A computer program can easily take the sagittal information and design an optimum lens.

11 Claims, 5 Drawing Sheets

U.S. PATENT DOCUMENTS

| | | |
|---|---|---|
| 5,020,898 A | 6/1991 | Townsley |
| 5,085,013 A | 2/1992 | Ascosi et al. |
| 5,141,301 A | 8/1992 | Morstad |
| 5,191,365 A | 3/1993 | Stoyan |
| 5,349,395 A * | 9/1994 | Stoyan ............. 351/161 |
| 5,691,797 A * | 11/1997 | Seidner et al. ............. 351/161 |
| 5,788,957 A | 8/1998 | Harris |
| 5,929,968 A | 7/1999 | Cotie et al. |
| 5,963,297 A * | 10/1999 | Reim ............. 351/160 R |
| 6,543,897 B1 * | 4/2003 | Tung ............. 351/161 |
| 6,582,077 B1 * | 6/2003 | Tabb et al. ............. 351/177 |

FOREIGN PATENT DOCUMENTS

| | | |
|---|---|---|
| JP | 52-10742 | 1/1977 |
| JP | 52-77738 | 6/1977 |

\* cited by examiner

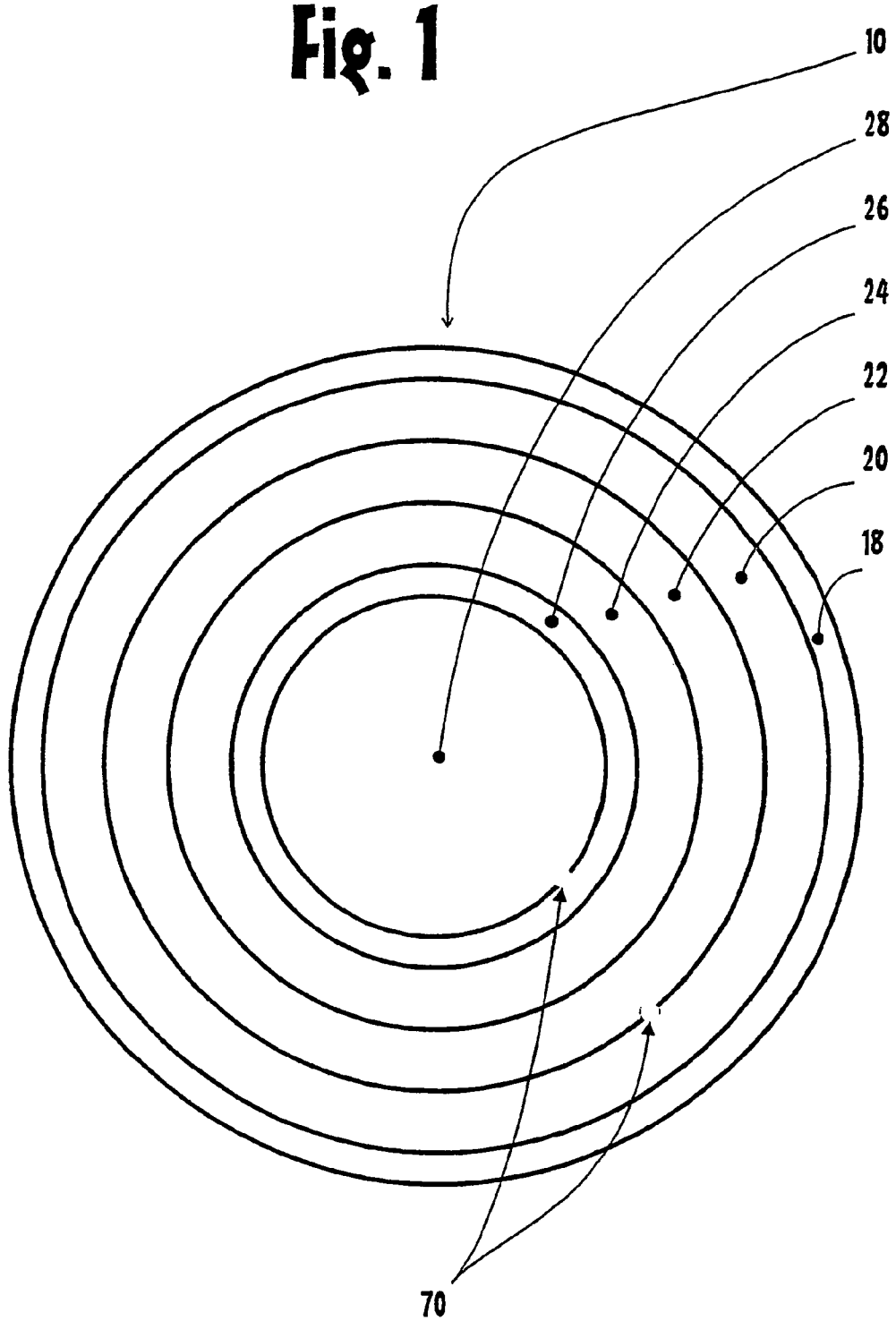

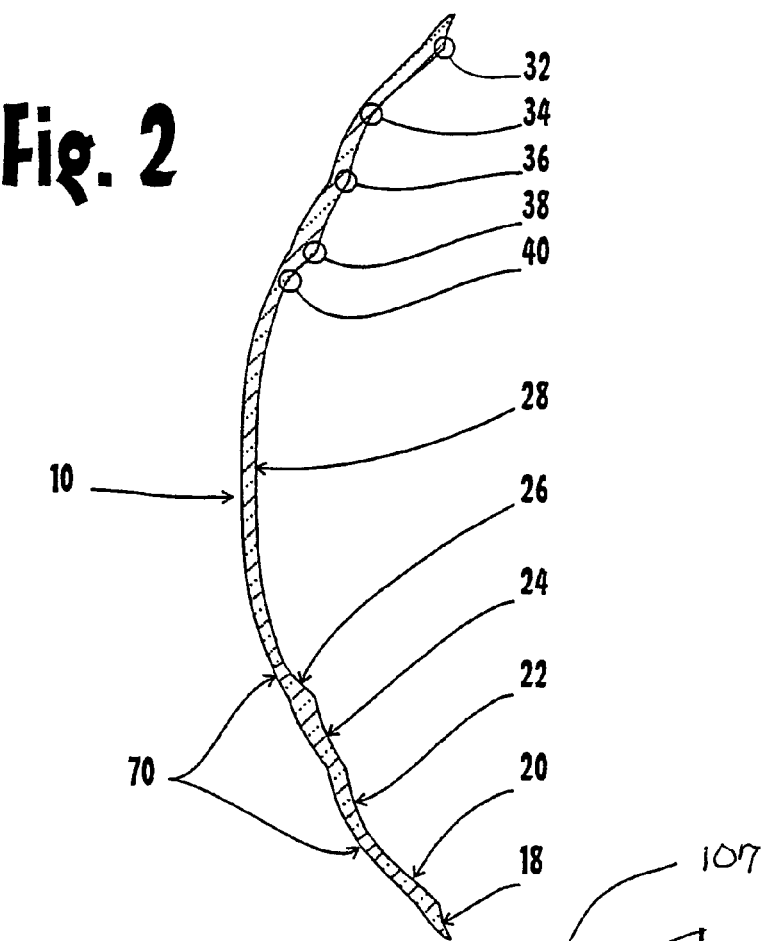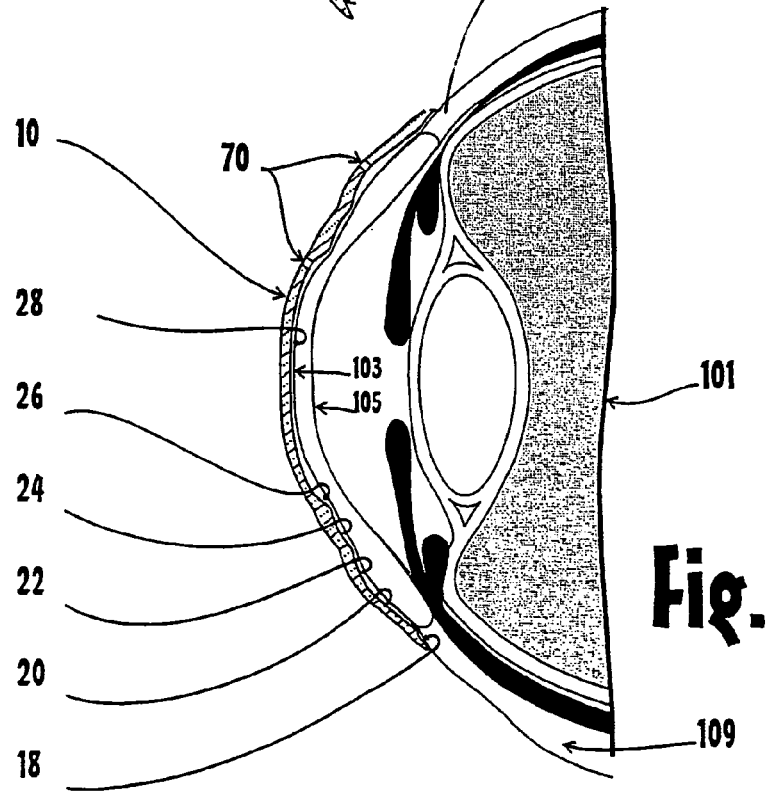

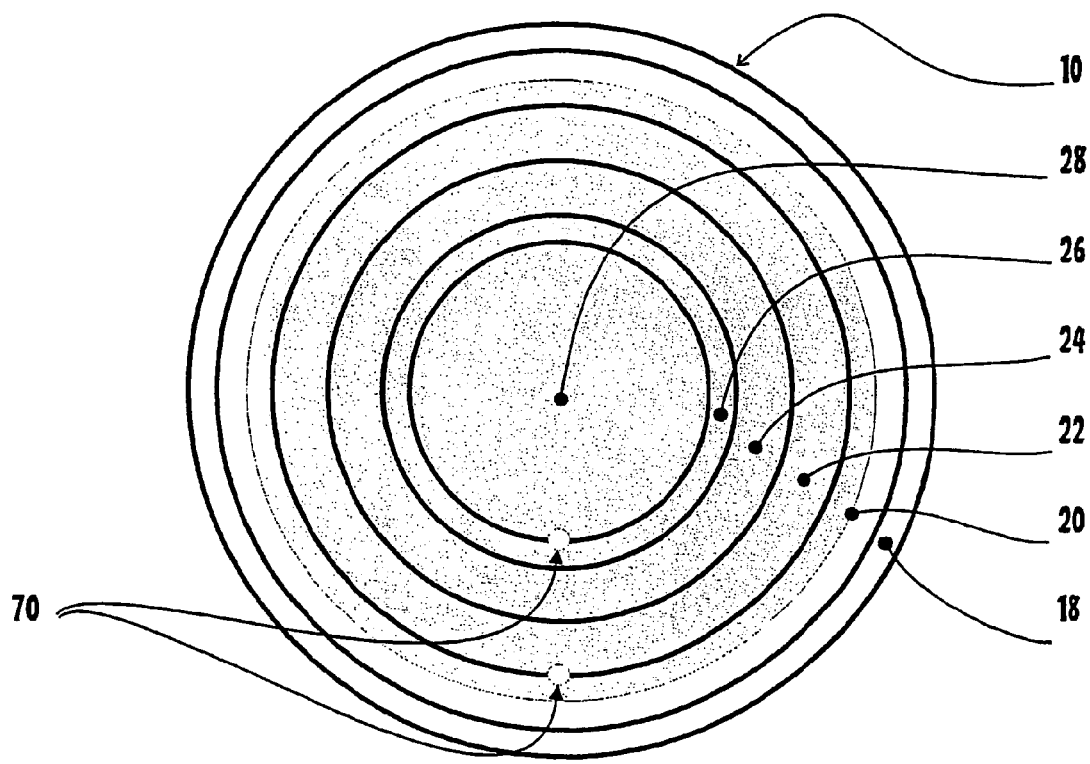

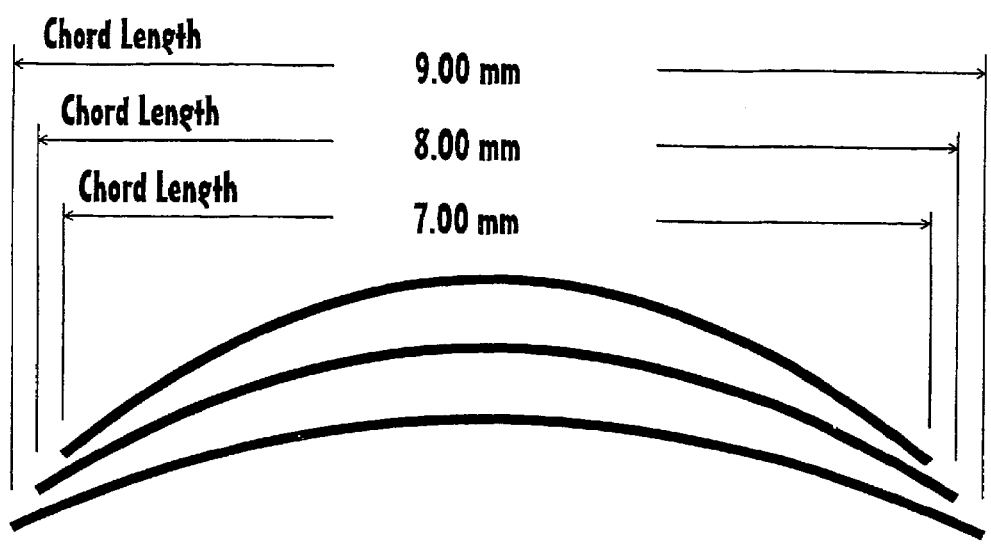

CORNEAL-SCLERAL ORTHOKERATOLOGY CONTACT LENS

CROSS REFERENCE TO RELATED APPLICATION

This application claims the benefit of Provisional Patent Application Ser. No. 60/634,494 filed Jan. 12, 2005, herein incorporated by reference.

BACKGROUND OF THE INVENTION

This invention relates generally to contact lenses, and more particularly to rigid gas permeable corneal-scleral contact lenses for reshaping the cornea of an eye on a temporary basis to treat visual acuity deficiencies, a process known as orthokeratology. The invention further relates to methods of designing and application of such lenses, and means of obtaining key measurements from the eye by the use of diagnostic lenses.

SUMMARY OF THE INVENTION

The prior art is replete with innovations in contact lens designs for orthokeratology. All of these designs are by necessity made from rigid contact lens materials. Soft contact lens material will not exert sufficient localized pressure to alter the shape of the cornea. It is believed that all previous orthokeratology designs, patented or otherwise, have been corneal contact lenses, with the exception of one patent, #No. 5,929,968, which is a corneal-scleral lens. Although the molding contact lens disclosed in this patent is well suited for its intended purpose, there is a continual need for improvement. By definition, a corneal contact lens is supported entirely by the cornea. Therefore, all functions of the lens must take place on the cornea, such as vision, corneal orthokeratology treatment, tear exchange, curves for comfort, curves to center the lens and curves for edge contour. Each part of a corneal contact lens has a fitting duty and in the case of orthokeratology, some parts are multifunctional. This is a real problem, compromises must be made in corneal orthokeratology contact lens designs when, for example, centering, and treatment issues cross-functional lines. Many attempts have been made to address problems of more reliable centering, dislodging, adherence, faster treatment, lasting treatment, more reliable treatment, and comfort. Although the orthokeratology corneal contact lens designs produced some amazing results, all of the problems listed above are still present to some degree and after fifty years of designing and tweaking designs of corneal orthokeratology contact lenses, it could be assumed that these problems are indigenous to corneal lenses. Properly fitted corneal contact lenses are required to have some movement with each blink and with eye rotation. In the case of orthokeratology the movement is highly controlled as noted in Tabb and Ballegeer's U.S. Pat. No. 6,582,077 B1 column six (6). The necessity for movement with corneal contact lenses presents the opportunity for lens decentering, dislodgment, adherence, blurring or shrinking of the treatment zone, and friction that can compromise comfort.

The present invention is directed to solving the problems set forth above. It is therefore an object of the invention to have an orthokeratology lens where the centering is completely reliable and independent of the treatment.

It is also an object of the invention to have an orthokeratology contact lens that has no chance of dislodgement once in place on the eye.

A further object of the invention is to have an orthokeratology lens that can not adhere to the cornea.

Another object of the invention is that for fast, reliable and comfortable results, it is also desirable to have specially designed corneal-scleral lenses that can be used to accurately determine the ocular sagittal height at various known ocular cord diameters for precise lens design purposes, for all corneal-scleral lenses as well as orthokeratology.

In accordance with one aspect of the present invention a corneal-scleral orthokeratology contact lens is formed of a rigid gas permeable material and has a central posterior treatment surface designed to have the same predetermined arc length in the treatment area when corneal treatment curvatures vary. The use of consistent arc lengths rather than chord diameter (optical zone) overcomes the deficiencies of the prior art by treating the same variorum of the epithelium at each corneal curvature.

In another aspect of the invention, a corneal-scleral orthokeratology contact lens is formed of a rigid gas permeable material having asymmetric blends, between spherical or aspherical curves where as the blends are wider to the edge side of the zone and more narrow to the inner side. Example: the juncture between 7.0-millimeter zone would be: the outside blend would be 0.4 millimeters (7.4) and the blend on the inside would be 0.2 millimeters (6.8).

The ability to properly treat an eye is greatly increased when the acceleration of flattening of the eye is accommodated by the lens design.

In another aspect of the present invention an orthokeratology contact lens formed of a rigid gas permeable material being a corneal-scleral contact lens, the peripheral portion being adapted to be positioned over the limbus and scleral portions of the eye and with similar radii centering the lens from outside the cornea relieving the orthokeratology treatment area of all centering responsibility.

Still another aspect of the invention is a method of determining the total sagittal height of the eye at a given chord diameter to predetermine exact fitting parameters and predict visual outcome. Trial lenses with exact chords and sagittal height are placed on the eye and with the use of fluorocein, the contact lens fitter can observe a three point touch pattern when the sagittal height of the lens matches the sagittal height of the eye. It is also possible to extract sagittal and chord information about the eye from some ocular topographer and once this information is obtained, simple formulas may be employed for lens designs.

In addition to providing an orthokeratology contact lens that provides more predictable results because of the consistent treatment volume of the epithelium cells and controlled scleral-limbal centering and added comfort because the lens edges are tucked under the eyelids, as it can be seen from a study of the above description and its drawing, the lens embodying the present invention, unlike corneal orthokeratology lenses, is particularly beneficial in treating visual acuity deficiencies by being used as a retainer lens in a flexible wear schedule. It is not required to be worn just at night. The lens can be worn during the day for a few hours, removed and provide the subject with functional unaided vision for several hours.

Alternatively, the lens can be worn as a standard daily wear contact lens and simply have good functional unaided vision when the lens is removed.

A further alternative is that the lens could be worn sporadically if desired. Once the fit is obtained it would not change for at least a year and the comfort is such that there is virtually no adaptation time.

In summary there is taught a corneal-scleral orthokeratology contact lens formed of rigid gas permeable material with uniform arc lengths in the treatment area even when the corneal curvature varies and asymmetric blends or splines, sometimes referred to as minor zones, formed on the posterior surface of the lens. The portion of the blend or spline is shorter toward the lens center and broader toward the lens edge. The design will relieve the treatment area of the lens of all centering responsibility, transferring centering responsibility to the limbal-scleral region so the treatment area can be designed to treat without concern of centering.

The method of determining the total sagittal height of an eye at a given chord diameter to predetermine exact fitting parameters and predict unaided visual outcome trial lenses, with exact chord and sagittal height values used to match the sagittal height of an eye, is also taught herein.

The sagittal value may be obtained from some ocular topographers. A computer program can easily take the sagittal information and design an optimum lens that has comfort that a corneal orthokeratology lens can not deliver, while providing greater unaided visual accuracy and longer holding time. With this design the lens will not dislodge and may be worn as an everyday contact lens.

The above summary does not include an exhaustive list of all aspects of the present invention. Indeed, the inventor contemplates that his invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

A more complete understanding of the present invention can be derived by referring to the detailed description when considered in connection with the following illustrative figures. Additionally, all included figures are non-limiting illustrations of the exemplary embodiment and modes, which similarly avail themselves to any equivalent modes or embodiments that are known or obvious to those of reasonable skill in the art.

FIG. 1 is a frontal view of the preferred embodiment of the corneal-scleral orthokeratology contact lens embodying the present invention;

FIG. 2 is a cross-sectional view of the orthokeratology contact lens embodying the present invention in FIG. 1;

FIG. 3 is a frontal view of the preferred embodiment of the corneal-scleral orthokeratology contact lens embodying the present invention, showing the lens in a normal wearing position over the cornea, limbus, and a small portion of the sclera of the eye;

FIG. 4 is a cross-sectional view of the frontal portion of an eye showing the preferred embodiment of the corneal-scleral orthokeratology contact lens embodying the present invention in the normal wearing position over the cornea, limbus, and a small portion of the sclera of the eye;

FIG. 5 is a cross-sectional view of the central treatment zone of the corneal-scleral orthokeratology contact lens embodying the present invention where the arc lengths are the same and the radius and chord lengths differ;

FIG. 6 is a cross-sectional view of the central treatment zone in FIG. 5 where the arcs have been flattened, demonstrating their length are the same;

DETAILED DESCRIPTION OF EXEMPLARY EMBODIMENTS

Figure 7:
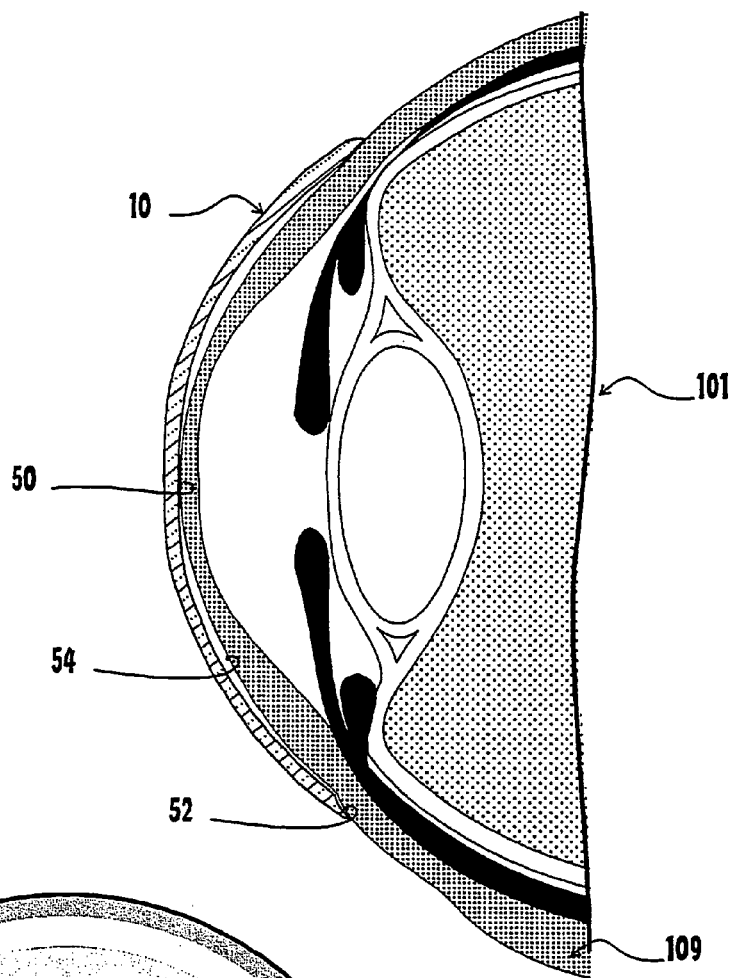
FIG. 7 is a cross-sectional view of the frontal portion of an eye showing the preferred embodiment of a corneal-scleral contact lens having a predetermined chord length and sagittal height used to match the sagittal height of the eye.

In this specification and in the claims which follow, reference will be made to a number of terms which shall be defined to have the following meanings: The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed and equivalents inherently known or obvious to those of reasonable skill in the art. Other combinations and/or modifications of structures, arrangements, applications, proportions, elements, materials or components used in the practice of the instant invention, in addition to those not specifically recited, may be varied or otherwise particularly adapted to specific environments, manufacturing specifications, design parameters or other operating requirements without departing from the scope of the instant invention and are intended to be included in this disclosure.

Moreover, unless specifically noted, it is the inventors' intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If it is intended to limit or narrow these meanings specific, descriptive adjectives will be used. Absent the use of these specific adjectives, the words and phrases in the specification and the claims should be given the broadest possible, generic meaning. If any other special meaning is intended for any word or phrase, the specification will clearly state and define the special meaning.

The use of the words "function," "means," or "step" in the specification or claims is not intended to invoke the special provisions of 35 U.S.C. 112, Paragraph 6, to define the invention(s). To the contrary, if the provisions of 35 U.C.C. 112, Paragraph 6 are intended to be invoked to define the invention(s), then the claims will specifically state the phrases "means for" or "step for" and a function, without recitation in such phrases of any material, structure, or at in support of the function. Contrastingly, the intention is NOT to invoke the provisions of 35 U.S.C. 112, Paragraph 6 when the claims recite a "means for" or a "step for" performing a function with recitation of any structure, material, or act in support of the function. If the provisions of 35 U.S.C. 112, Paragraph 6 are invoked to define the invention(s) it is intended that the inventions not be limited only to the specific structure, materials, or acts that are described in the preferred embodiments, but in addition to include any and all structures, materials, or acts that perform the claimed function, along with any and all known or later-developed equivalent materials, structures, or acts for performing the claimed function.

Throughout this document, various exemplary embodiments and the best modes, known to the inventors at this time, of the invention are disclosed. These embodiments and modes are not intended to limit the scope, applicability, or configuration or the invention in any way. Rather, the following disclosure is intended to teach both the implementation of the exemplary embodiments and modes and any equivalent modes or embodiments that are known or obvious to those of reasonable skill in the art. Additionally, all included figures are non-limiting illustrations of the exemplary embodiments and modes, which similarly avail themselves to any equivalent modes or embodiments that are known or obvious to those of reasonable skill in the art.

Referring first to FIGS. 1, 2 and 3 there is shown a corneal-scleral orthokeratology contact lens 10 embodying the principle of the present invention. The lens 10 extends over both the cornea 105 and a contiguous portion of the sclera 107 of the eye, and is constructed of a rigid gas permeable (RGP) material, which will allow the cornea 105 to breath (meaning the exchange of oxygen and carbon dioxide). The orthokeratology contact lens 10 has ocular bearing areas on the limbus, a small portion of the sclera 107, and selected areas of the cornea 105 so that when the eyelid (not shown) is moved across the lens 10, such as by blinking, the eyelid bearing pressure is controllably distributed over the scleral 107 and the corneal portions of the eye 101.

By selective arrangement of the curvatures of the posterior surface 16 of the lens 10 and the ocular bearing areas, as described below in greater detail, the eye lid bearing pressure can be advantageously used to controllably alter the pre-defined shape of the cornea.

In the preferred embodiment of the present invention, as shown in FIG. 1 through FIG. 4, the posterior surface 16 of the orthokeratology corneal-scleral contact lens 10 is defined by six concentrically disposed ocular zones 18-28 and five minor ocular zones 32-40 which are asymmetric blends connecting the six major zones where the inward position of the blend is less than the outward portion. The outermost major zone 18 and the outermost minor zone 32 are disposed over the scleral portion of the eye and are referred to herein as the scleral zones and have radial widths of from about 0.1 millimeter to about 1.0 millimeters which provides a stable, load distributing, scleral footing for the lens 10. In the lens 10 embodying the present invention, the next zone inwardly from the scleral minor zone 32 is approximately aligned with the limbus 107 of the eye, i.e., the border that is clearly defined between the cornea and the sclera of the eye, and for descriptive purposes will be referred to herein as the limbic zone. The next major zone inwardly from the limbic zone is positioned near the outer edge of the cornea and is identified herein as the peripheral-corneal zone 20. The curvature of the peripheral-corneal zone 20 is key to the overall fit of the lens. It is this curve that is either steeper or flatter to match the overall sagittal height of the eye at the desired ocular chord diameter. The next zone inwardly from the peripheral corneal zone 20 is the next major mid corneal zone 22 which will be referred to herein as the mid corneal zone 22.

Peripheral-corneal zone 20, minor zone 34 and mid-corneal zone 22 work in concert to vault the cornea slightly to give a place for tears to pool. At the apex of the vault the lens is fenestrated 70 to balance the pressure from the anterior and posterior surfaces to prevent adhesion. The size of the fenestration 70 is between 0.2 millimeters and 1.0 millimeters.

The next most inward zone is minor zone 36 which connects zone 22 to the next major zone 24, which is the first treatment zone exerting a small amount of pressure on the underlying corneal epithiums. The next most inward zone is the minor zone 38 connecting the first treatment zone and zone 26. The curvature of zone 26 is varied steeper or flatter to match the sagittal height of the cornea in its final treated state. And the next most inward minor zone 40 connects the treatment zone sagittal adjustment curve with the second treatment curve 28. The curve of the second treatment zone 28 is nothing new, it has been done for over fifty years. Simply add the sphere component of the refraction to the flat "K" reading. If desired an additional –0.50 D or –0.75 D may be added.

Referring to FIG. 5 and FIG. 6 there is shown the treatment area of the corneal-scleral orthokeratology contact lens 10 embodying one of the principles of the present invention. In the preferred embodiment of the present invention, the arc length of the treatment zone is held constant as the curvature of the eye changes. This method maintains a very close relationship to the same area of treatment regardless of the curvature of the eye, giving addition accuracy to the overall process for steep and flat eyes.

Figure 8:
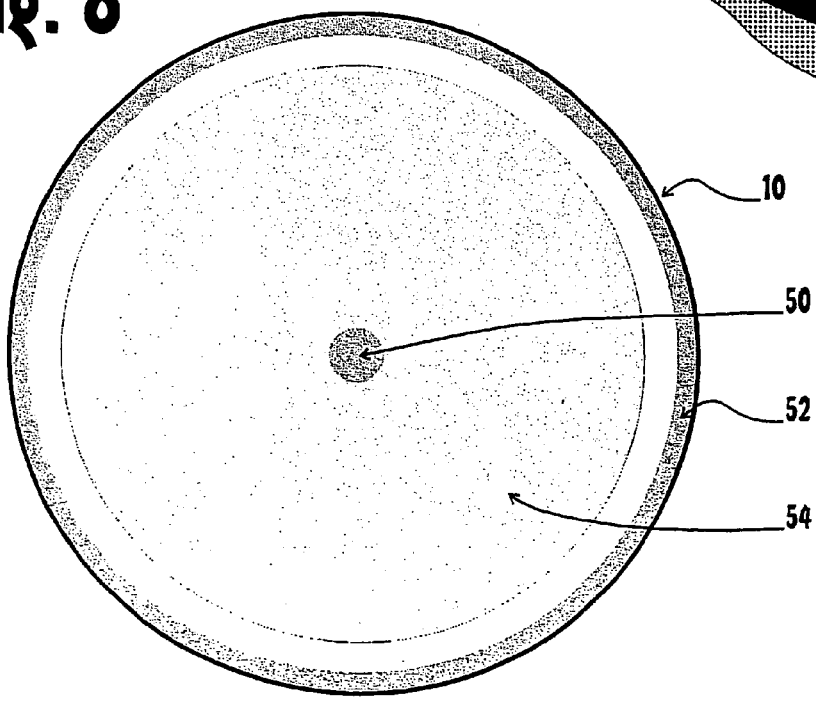
FIG. 8 is a frontal view a portion of an eye showing the preferred embodiment of a corneal-scleral contact lens having a predetermined chord length and sagittal height matching the sagittal height of the eye.

Referring to FIGS. 7 and 8 there is shown a non-orthokeratology corneal-scleral contact lens with a predetermined chord length and sagittal height being used to match the sagittal height of the eye by the use of a touch pattern. The touch spots 50 and 52 with a vault 54 between 50 and 52 indicates a match with the eye.

It can be appreciated from the above description that in one embodiment of the invention a corneal-scleral orthokeratology contact lens is formed of rigid gas permeable material having the central posterior treatment surface (base curve) predetermined to have the same arc length for each corrective base curve required to satisfy each visual correction and corneal curvature presented by the human eye, a second portion not related to the treatment of orthokeratology, which extends over the peripheral cornea, limbus and a small portion of the scleral surface of the eye, to relieve the treatment area of all lens centering responsibility, a third aspect is minor zones which are asymmetric blends connecting the major curves where the inward most portion of each blend is less then the outward portion.

The contact lens, as set forth above, may have three major zones for orthokeratology treatment, two for treatment, and a third for the control of the sagittal height of the overall treatment area.

The contact lens, as set forth above, may have three major edge zones, the outer most to align with a small portion of the sclera and the limbus to center the lens, the next inward curve controls the overall sagittal height of the lens, and the third vaults the peripheral cornea for tear exchange.

Furthermore, and as taught above, another embodiment of the invention is a corneal-scleral diagnostic set of contact lenses formed of a rigid contact lens material each lens having a predetermined sagittal height and chord diameter, one of which will match the sagittal height of almost any eye. The determination is made by employing a three touch spot pattern where the peripheral curve of the lens touches the scleral 360°, and the center of the lens touches the central cornea.

A resulting contact lens design may use the sagittal height information obtained from the diagnostic fitting set forth above.

The contact lens may be any design corneal-scleral contact lens.

While the invention is described herein in terms of preferred embodiments and generally associated methods, the inventor contemplates that alterations and permutations of the preferred embodiments and methods will become apparent to those skilled in the art upon a reading of the specification and a study of the drawings. Below is a listing of some examples of variations contemplated by the inventor and falling within the scope of the claims unless excluded by specific claim language.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim.

What is claimed is:

1. A rigid gas permeable corneal-scleral orthokeratology contact lens, comprising:
    a) a treatment zone of the lens having a central posterior treatment surface having a predetermined constant arc length consistent for different chord lengths of corrective base curves of the treatment zone
    b) a second portion of the corneal-scleral orthokeratology contact lens extending over the peripheral cornea, the limbus and a small portion of the scleral surface of an eye, whereby lens centering is relieved from the treatment zone of rigid gas permeable corneal-scleral orthokeratology contact lenses.

2. The invention in accordance with claim 1 wherein the second portion of the contact lens transfers lens centering responsibility from a central posterior treatment surface area of the contact lens to the scleral surface of the eye.

3. The invention in accordance with claim 1 comprising a zone of asymmetric blends connecting the base curves wherein the inward most portion of each blend is less then the outward portion.

4. The invention in accordance with claim 1 comprising major zones, more than one of which major zones is used for providing orthokeratology treatment when said corneal-scleral orthokeratology contact lens is positioned on an eye of the wearer of the lens.

5. The invention in accordance with claim 4 wherein two of the major zones are for treatment, and a third of said major zones is used for the control of the sagittal height of the overall treatment area of the eye.

6. The invention in accordance with claim 1 wherein the corneal-scleral orthokeratology contact lens further comprises three major edge zones, a first of the edge zones being an outer most edge zone to align with a portion of the sclera and the limbus to center the lens.

7. The invention in accordance with claim 6 wherein the corneal-scleral orthokeratology contact lens further comprises an inward curve for control of the overall sagittal height of the lens.

8. The invention in accordance with claim 6 wherein the corneal-scleral orthokeratology contact lens comprises a major edge zone that vaults the peripheral cornea.

9. The invention in accordance with claim 1 wherein the corneal-scleral orthokeratology contact lens comprises;
    a first edge zone being an outermost edge zone to align with a small portion of the sciera and the limbus to center the lens;
    a second major edge zone having an inward curve controlling the overall sagittal height of the lens; and
    a third major edge zone vaulting the peripheral cornea.

10. The invention in accordance with claim 1 wherein the central posterior treatment surface has substantially the same arc length for each different corrective base curve experienced as the eye adjusts to correction as a result of wearing the lens.

11. The invention in accordance with claim 10 wherein the central posterior treatment surface with substantially the same arc length for each different corrective base curve experienced as the eye adjusts to correction resulting from eye lid bearing pressure being advantageously used to controllably alter the predefined shape of the cornea.

* * * * *